United States Patent
Raynaud et al.

[15] 3,696,100
[45] Oct. 3, 1972

[54] N-(6-METHYL-6-OL-2-HEPTYL)-N'-SUBSTITUTED PIPERAZINES

[72] Inventors: Guy M. Raynaud; Claude P. Fauran; Michel J. Turin, all of Paris; Bernard M. Pourrias, Meudon La Foret; Gerard J. Huguet, Malesherbes, all of France

[73] Assignee: Delalande S.A., Regnault, France

[22] Filed: April 13, 1970

[21] Appl. No.: 28,057

[30] Foreign Application Priority Data

April 22, 1969  France..................6912510

[52] U.S. Cl......260/247.5 R, 260/240 K, 260/268 R, 260/268 H, 424/248, 424/250
[51] Int. Cl. ..............................C07d 51/70
[58] Field of Search.................260/240 K, 268 R, 268 H, 247.7 A, 260/247.5 R

[56] References Cited

UNITED STATES PATENTS 3,573,291  3/1971  Fauran et al...............260/240

OTHER PUBLICATIONS

Morrison et al., " Organic Chemistry" 2nd Edition, Allyn and Bacon, Inc., Boston, Mass. (1966), pp. 188–189.

Primary Examiner—Henry R. Jiles
Assistant Examiner—G. Thomas Todd
Attorney—Woodhams, Blanchard and Flynn

[57] ABSTRACT

Piperazines of the formula

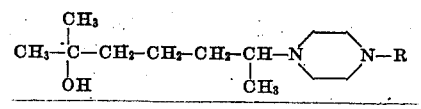

in which
R is a straight or branched chain alkyl radical, which may be substituted by a hydroxyl, of one to seven carbon atoms, a cinnamyl radical, or a radical of the formula

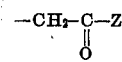

in which Z is hydroxy, alkoxy or a heterocyclic radical.

The compounds are prepared by alkylating an N substituted piperazine with 2-bromo-6-methyl 5-heptene and then hydrating the reaction product in a sulfuric acid medium.

The compounds may be incorporated with therapeutically acceptable carriers to make compositions exhibiting analeptic cardio-vascular effects.

6 Claims, No Drawings

N-(6-METHYL-6-OL-2-HEPTYL)-N'-SUBSTITUTED PIPERAZINES

The present invention relates to novel N-(6-methyl-6-ol-2-heptyl)-N'-substituted piperazines, their process of preparation and their therapeutic utilization.

The novel piperazines of the present invention correspond to the general formula:

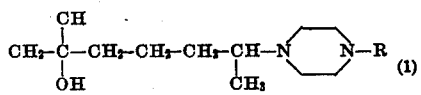

in which R represents:
- a linear or branched-chain alkyl radical having one to seven carbon atoms;
- a linear or branched-chain alkyl radical having one to seven carbon atoms and substituted by a hydroxy radical;
- a cinnamyl radical, or
- a radical of formula:

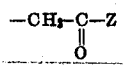

in which Z represents a hydroxy radical, an alkoxy radical or a heterocyclic radical.

The process for preparing the compounds according to the present invention comprises hydrating, in a sulfuric acid medium, a N-(6-methyl-2-hept-5-enyl)-N'-substituted piperazine of the general formula:

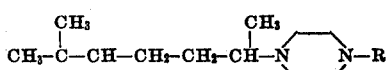

in which R has the same significance as in formula (1).

The N-(6-methyl-2-hept-5-enyl)-N'-substituted piperazines of formula (2) are novel compounds. They are obtained by alkoylation of an N-substituted piperazine of the general formula:

in which R has the same significance as in formula (1), with 2-bromo-6-methyl-5-heptene of formula:

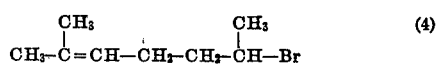

The following preparations are given by way of non-limitative examples to illustrate the present invention.

EXAMPLE 1

N-(6-methyl-6-ol-2-heptyl)-N'-methyl piperazine dihydrochloride.

0.6 mole of N-methyl piperazine and 0.66 mole of 2-bromo-6-methyl-5-heptene are dissolved in 400ml. of methyl-amyl-ketone, and 90g. of sodium carbonate is added thereto. The mixture is then refluxed for 10 hours. Thereafter, 10 percent hydrochloric acid is added to the mixture. The aqueous phase is decanted, alkalinised and extracted with ethyl acetate. After concentration, the crude product is purified by distillation. The N-(6-methyl-2-hept-5-enyl)-N'-methyl piperazine boils at 100° C under 0.05mm. Hg.

This compound is dissolved in 150 ml. of 30 percent sulfuric acid and the mixture is agitated at 40° C for 5 hours. Thereafter, concentrated soda is added to render the reaction mixture alkaline, and extraction is effected with ether. After elimination of the solvent, a crude product is obtained which distills at 136° C under 0.1mm. Hg.

By bubbling hydrochloric acid gas through a solution in acetone of the N-(6-methyl-6-ol-2-heptyl)-N'-methyl piperazine formed, the dihydrochloride is obtained.

Melting point = 225° C (with decomposition)
Yield = 71 percent
Empirical formula = $C_{13}H_{20}Cl_2N_2$ O Elementary analysis:
Calculated, %: C: 51.82; H: 10.04; Cl: 23.54; N: 9.30
Found, %: C: 51.94; H: 10.25; Cl: 23.29; N: 9.13

EXAMPLE 2

N-(6-methyl-6-ol-2-heptyl)-N'-)pyrrolidino carbonylmethyl)piperazine dihydrochloride 0.3 mole of N-(pyrrolidinocarbonylmethyl)piperazine, 0.33 mole of 2-bromo-6-methyl-5-heptene and 45g. of sodium carbonate are added to 200 ml. of methyl-amyl-ketone. After 9 hours under reflux, 300 ml. of water acidified with hydrochloric acid is added. The aqueous phase is alkalinised after decantation and extracted with ethyl acetate. The solvent is removed and the product obtained is distilled. The N-(6-methyl-2-hept-5-enyl)-N'-(pyrrolidinocarbonylmethyl)piperazine formed boils at 205° C under 0.1mm.Hg.

This compound is treated with 100 ml. of 33 percent sulfuric acid at 45° C for 5 hours. After addition of soda, extraction is effected with ethyl acetate. The dried solution is treated with hydrochloric acid gas and the precipitate of N-(6-methyl-6-ol-2-heptyl)-N'-(pyrrolidinocarbonylmethyl)piperazine dihydrochloride formed is dried and crystallized in an acetone-water mixture.

Melting point = 200° C
Yield = 60%
Empirical formula = $C_{18}H_{37}Cl_2N_3O_2,H_2O$ Elementary analysis:
Calculated, %: C: 51.91; H: 9.44; Cl: 17.03; N: 10.09
Found, %: C: 52.04; H: 9.24; Cl: 16.76; N: 9.89

The compounds listed in the following table have been prepared according to the preceding examples:

| R | -CH₂CH₂OH | -CH₂-CO-N◯ | -CH₂-CO-N◯ | -CH₂-COOC₂H₅ | -CH₂-CH=CH-◯ |
|---|---|---|---|---|---|
| | | | -CH₂-CO-N◯O | | |
| Compounds of Formula (2): | | | | | |
| Boiling point, °C./mm. Hg | 145–150/0.3 | 212/0.3 | 195/200/0.2 | 141/0.1 | 165/0.3 |
| Salt | 2HCl | 2HCl | 2 \|CH—COOH / CH—COOH\| | 2HCl | 2 \|CH—COOH / CH—COOH\| |
| Melting point, °C | 230 | 216 | 160 | 190 | 196 |
| Yield, percent | 60 | 50 | 48 | 51 | 65 |
| Compounds of Formula (1): | | | | | |
| Empirical formula | C₁₄H₃₂Cl₂N₂O₂ | C₂₀H₄₁Cl₂N₃O₂ | C₂₆H₄₃N₃O₁₁ | C₁₆H₃₄Cl₂N₂O₃ | C₂₉H₄₂N₂O₉ |
| Analysis calculated, percent: | | | | | |
| C | 50.75 | 56.32 | 54.44 | 51.47 | 61.90 |
| H | 9.74 | 9.69 | 7.56 | 9.18 | 7.52 |
| Cl | 21.40 | | | | |
| N | 8.46 | 9.85 | 7.33 | 7.51 | 4.98 |
| Found, percent: | | | | | |
| C | 50.93 | 56.30 | 54.45 | 51.77 | 62.10 |
| H | 9.77 | 9.47 | 7.50 | 9.00 | 7.28 |
| Cl | 21.52 | | | | |
| N | 8.63 | 9.94 | 7.43 | 7.68 | 4.87 |

The compounds of formula (1) exert analeptic cardio-vasculary effects on laboratory animals as can be evidenced by treating an animal made weak by haemorrhage. This effect is shown by an increase in the arterial pressure.

The results of practical tests on a certain number of compounds of formula (1), as well as the toxicity thereof, are listed in the following table:

| R | Toxicity | | Tensional Activity | |
|---|---|---|---|---|
| | Means Of administration | Approximate LD50 | Active dose administered by intraveinous means | duration of action |
| —CH₃ | intravenous | 500 mg/kg | 10 mg/kg | >30 mn |
| | oral | > 2 g/kg | | |
| —CH₂—CO—N◯ | oral | > 2 g/kg | 20 mg/kg | 5 mn |
| —CH₂—CO—N◯ | oral | 1850 mg/kg | 10 mg/kg | > 50 mn |
| —CH₂—CH₂OH | intravenous | 430 mg/kg | | |
| | oral | 7 g/kg | 10 mg/kg | >60 mn |
| —CH₂—CO—N◯O | intravenous | 980 mg/kg | | |
| | oral | 1,100 mg/kg | 20 mg/kg | 10 mn |

As a result of the above, the therapeutic coefficient of the novel piperazines of the present invention is sufficiently great to enable the piperazines to be employed as medicaments in the treatment of cardiac diseases. They may be administered to humans in doses comprising between 10 and 500 mg. by intraveinous, intramuscular or oral means.

Accordingly, the present invention also comprises a therapeutic composition comprising a piperazine of the general formula (1) together with a therapeutically-acceptable carrier.

What we claim is:

1. A compound of the formula:

$$CH_3-\underset{\underset{OH}{|}}{\overset{\overset{CH}{\|}}{C}}-CH_2-CH_2-CH_2-\underset{\underset{CH_3}{|}}{CH}-N\diagdown N-R \quad (1)$$

in which R is:
a linear or branched-chain alkyl radical having one to seven carbon atoms;
a linear or branched-chain alkyl radical having one to seven carbon atoms and substituted by a hydroxy radical;
a cinnamyl radical, or
a radical of formula:

$$-CH_2-\underset{\underset{O}{\|}}{C}-Z$$

in which Z represents hydroxy, ethoxy, pyrrolidino, morpholino or hexamethylenimino,
and the pharmaceutically acceptable nontoxic acid addition salts thereof.

2. A compound according to claim 1 in which R is methyl.

3. A compound according to claim 1 in which R is pyrrolidino carbonylmethyl.

4. A compound according to claim 1 in which R is hexamethylenimino carbonylmethyl.

5. A compound according to claim 1 in which R is morpholino carbonylmethyl.

6. A compound according to claim 1 in which R is hydroxyethyl.

* * * * *

UNITED STATES PATENT OFFICE
CERTIFICATE OF CORRECTION

Patent No. 3 696 100          Dated   October 3, 1972

Inventor(s) Guy M. Raynaud, Claude P. Fauran, Michel J. Turin, Bernard M. Pourrias, Gerard J. Huguet It is certified that error appears in the above-identified patent and that said Letters Patent are hereby corrected as shown below:

The formula of Claim 1 should read as follows:

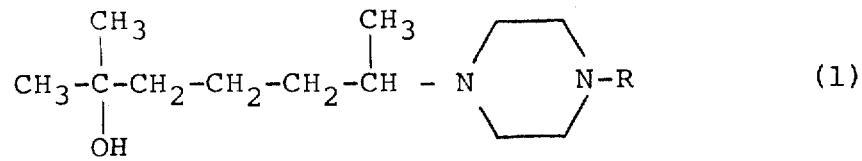      (1)

Signed and sealed this 13th day of March 1973.

(SEAL)
Attest:

EDWARD M. FLETCHER, JR.                ROBERT GOTTSCHALK
Attesting Officer                      Commissioner of Patents